B. Clayton,
Sleeve Button.
No 62,008. Patented Feb. 12. 1867.
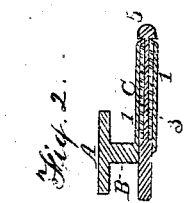
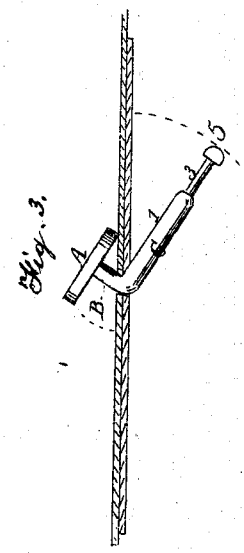
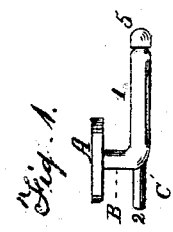
Witnesses:
Inventor
Barnes Clayton

United States Patent Office.

BARNES CLAYTON, OF PHILADELPHIA, PENNSYLVANIA.

*Letters Patent No. 62,008, dated February 12, 1867; antedated February 2, 1867.*

IMPROVEMENT IN SLEEVE-BUTTONS AND STUDS.

*The Schedule referred to in these Letters Patent and making part of the same.*

TO ALL WHOM IT MAY CONCERN:

Be it known that I, BARNES CLAYTON, of the city of Philadelphia, in the State of Pennsylvania, have invented a new and useful Improvement in Sleeve-Buttons and Studs; and I do hereby declare that the following is a full, clear, and exact description of the construction and operation of the same, reference being had to the accompanying drawings, making a part of this specification, in which—

Figure 1 is an enlarged side view of a shirt-bosom stud, having my improvement applied thereto.

Figure 2, a longitudinal vertical section of the same, as shown in fig. 1; and

Figure 3, the same stud as when being applied to the garment—

Like letters and numbers of reference indicating the same parts when in the different figures.

The object of my improvement is to afford a more reliable and appropriate self-adjusting fastening for a shirt-bosom stud or sleeve-button; and my invention consists in combining with the shank and head of a stud or button a bolt and spiral spring, in such a manner that after the shank has been drawn into the usual holes in the linen, by one's thumb and finger applied to the bolt, and then released, the bolt will be forced outward automatically so as to produce the fastening required.

In the drawings, A is the head of the stud; B its shank or stem, and C the spring bolt. The head A may be made of any form or fashion required for a stud, sleeve-button, or breast-pin. The stem or shank B is cylindrical, and projects perpendicularly from the centre of the back of the head A. The spring bolt C consists of a hollow cylinder, 1, open at both ends, (see fig. 2,) and soldered fast near one of its said ends to the projecting end of the shank or stem B, so as to be parallel with the face of the head A, and contains a slide, 2, having a slender stem, 3, surrounded by a spiral spring, 4, (within the cylinder,) and provided with a fixed head, 5, on its outer end. The opening at the free end of the hollow cylinder 1 corresponds in size with the slender stem 3, and thus there is formed around it an abutment against which one end of the spiral spring 4 bears, whilst the other end of the said spring bears against a shoulder produced by the junction of the inner end of the slide 2 and the said stem 3. The free end of the slide 2 projects about a quarter of an inch or more beyond the shank or stem B, while the free end of the cylinder 1 projects in the opposite direction about half an inch, more or less; and the spring 4 is capable of being compressed sufficiently to permit the projecting part of the slide 2 to be drawn entirely within the cylinder 1 by the operator's pulling outward the head 5, as indicated in fig. 3.

Operation: The free end of the cylinder 1 is inserted through two small eyelet-holes made in the two parts of the linen which are to be connected together, when, by means of the ends of one's thumb and finger, the head 5 of the slender stem 3 is drawn outward, and thus the free end of the slide 2 is drawn entirely within the cylinder 1, allowing the shank B to pass freely through the two eyelet-holes in the linen; after which passage the head 5 is released, and the slide 2 is forced out again by the action of the spring 4, thus securing the stud in place, (see fig. 2,) the faint lines indicating the two parts of the linen held together by the studs.

It will be seen that this invention does away with the button-holes heretofore required to be cut and stitched for attaching sleeve-buttons and studs; and as only small eyelet-holes are required, a simple stiletto, which can be used without cutting the linen, will answer the purpose of making the holes. It is, besides, very simply and easily attached and detached, and is not liable to get out of order in the operation.

I am aware that a split-spring bar has been applied in a tube fixed at a right angle to the end of the stem, and requiring that the said split-bar be pushed outward by hand in fastening the stud or button to the linen, as in Draper's case, referred to by the office; therefore I do not desire to claim anything shown in the said Draper's fastening, but having fully described my improvement, what I claim as new therein of my invention, and desire to secure by Letters Patent, is confined to the following, viz:

I claim, in combination with the shank and head of a shirt-bosom stud or sleeve-button, the self-adjusting fastening, consisting of the hollow cylinder 1, slide or bolt 2, and spiral spring 4, the same being constructed, arranged, combined, and operating together as and for the purpose described.

BARNES CLAYTON.

Witnesses:
BENJ. MORISON,
JAS. WINSMORE, Jr.